Oct. 11, 1932.  H. B. HULL  1,881,603
REFRIGERATING APPARATUS
Filed Dec. 30, 1930   5 Sheets-Sheet 1
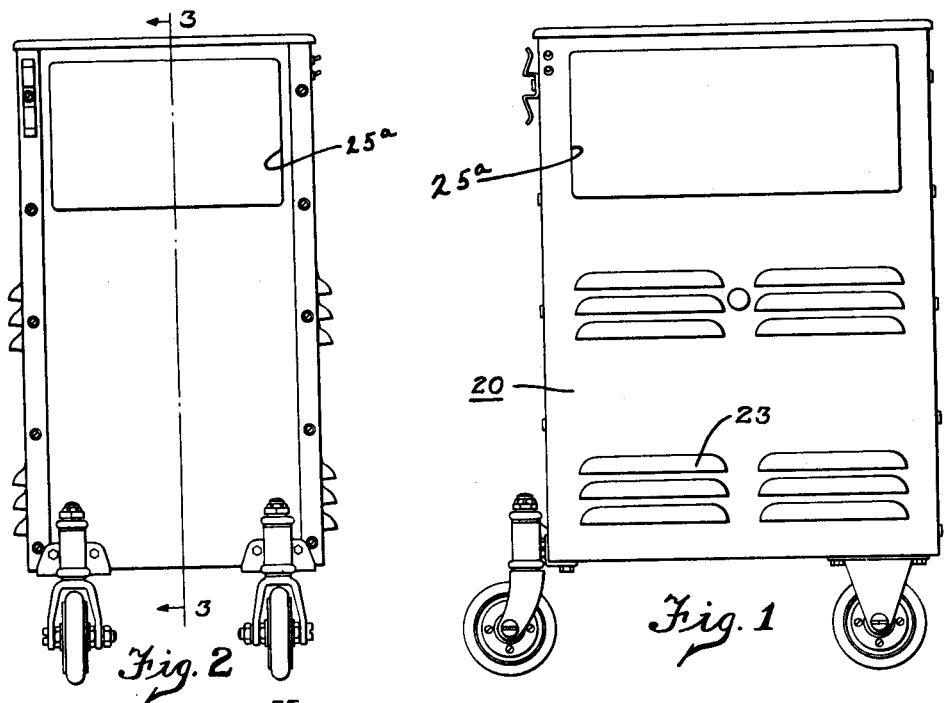
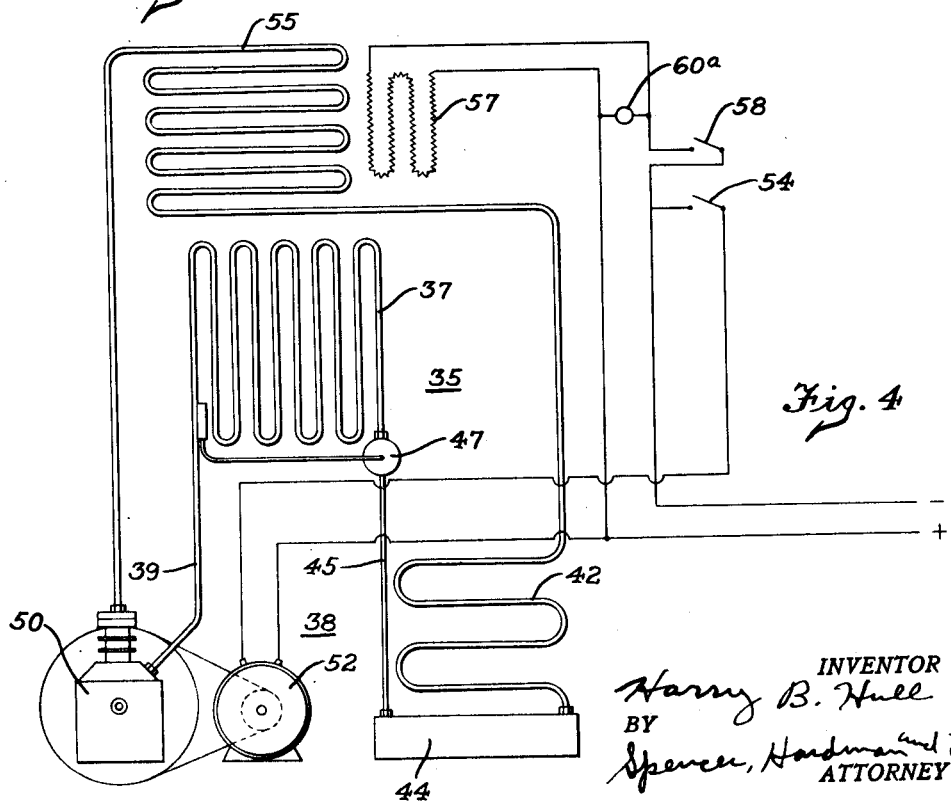

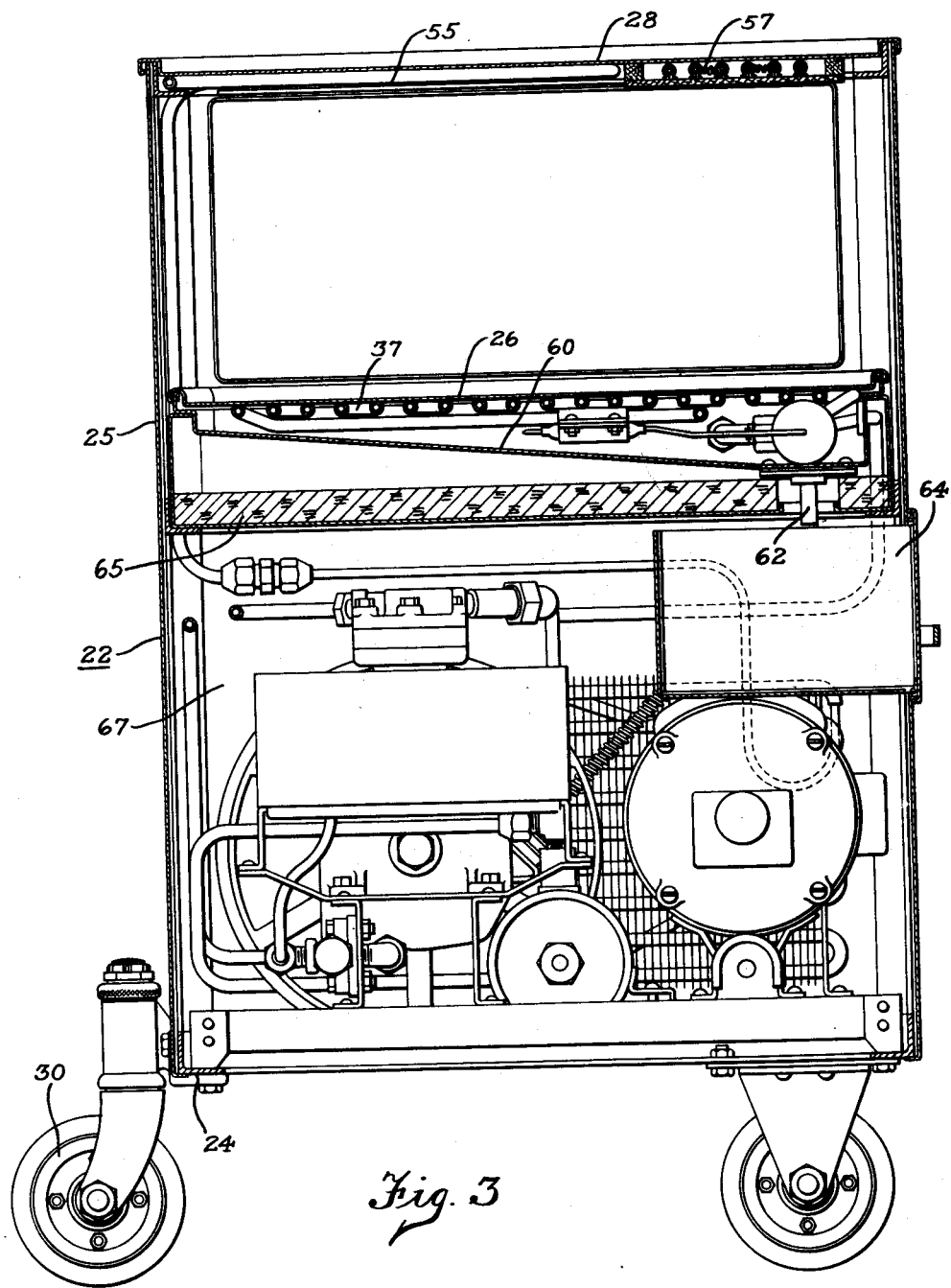

Oct. 11, 1932.  H. B. HULL  1,881,603
REFRIGERATING APPARATUS
Filed Dec. 30, 1930  5 Sheets-Sheet 3
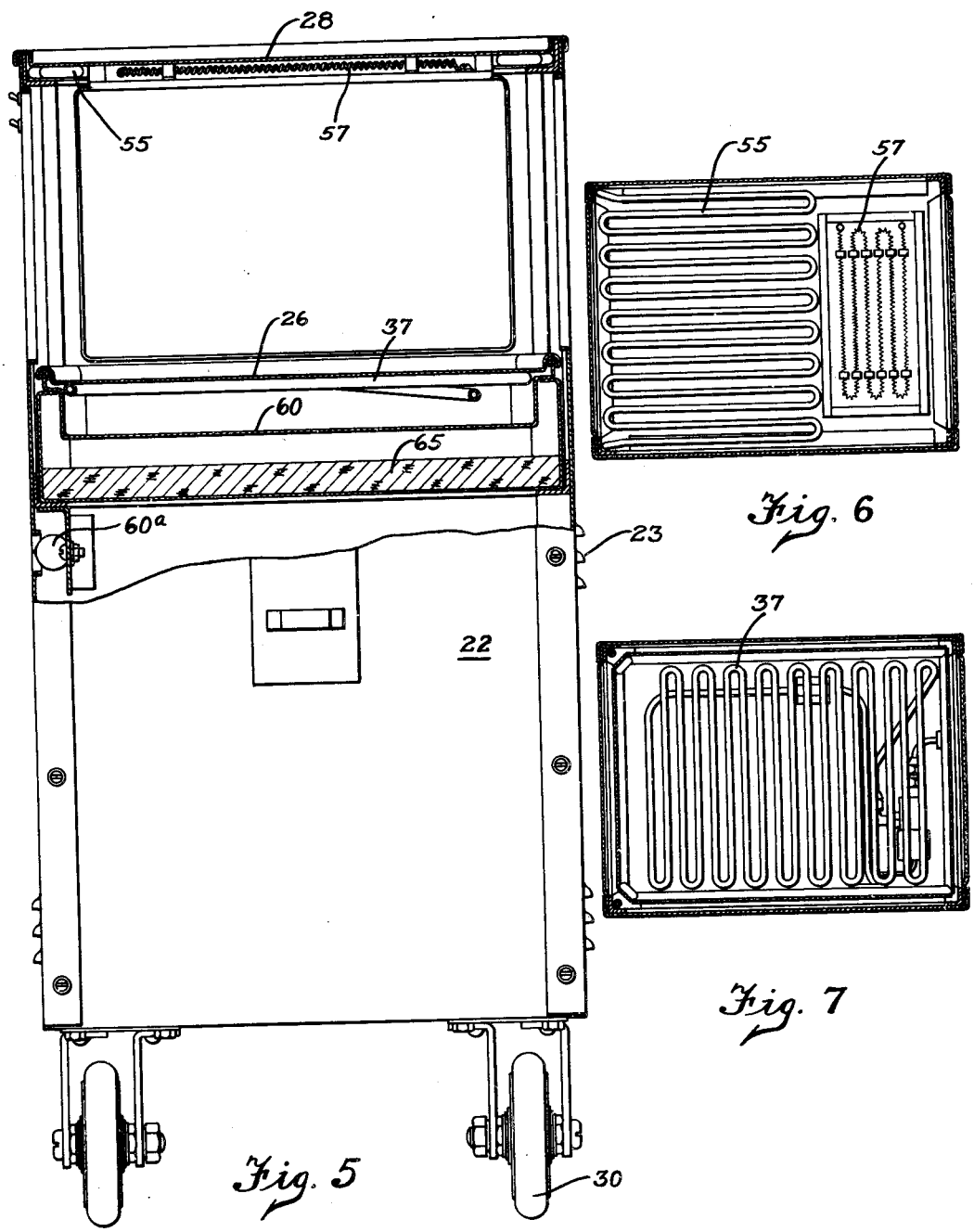
Harry B. Hull INVENTOR
BY Spencer, Hardman and John
ATTORNEY

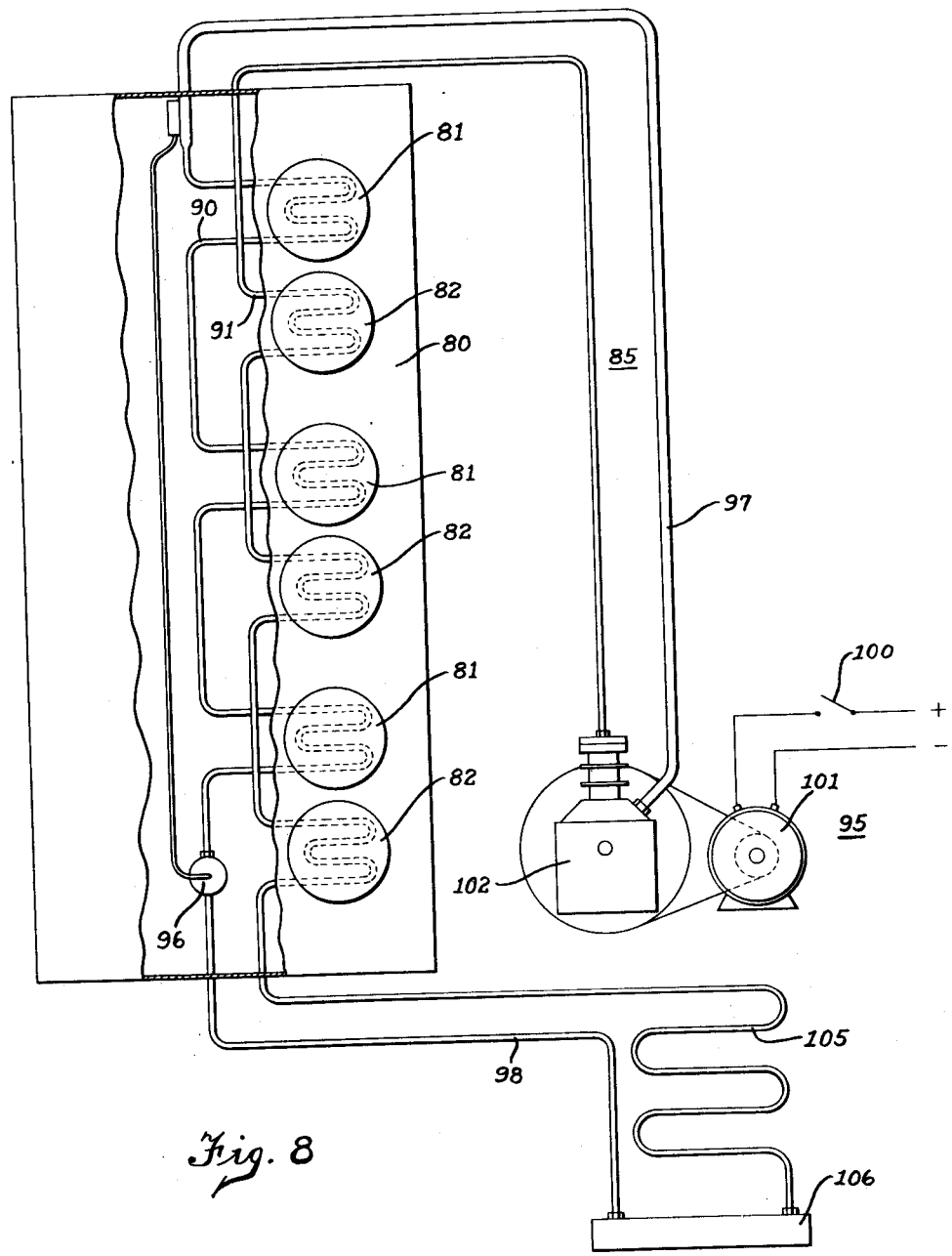

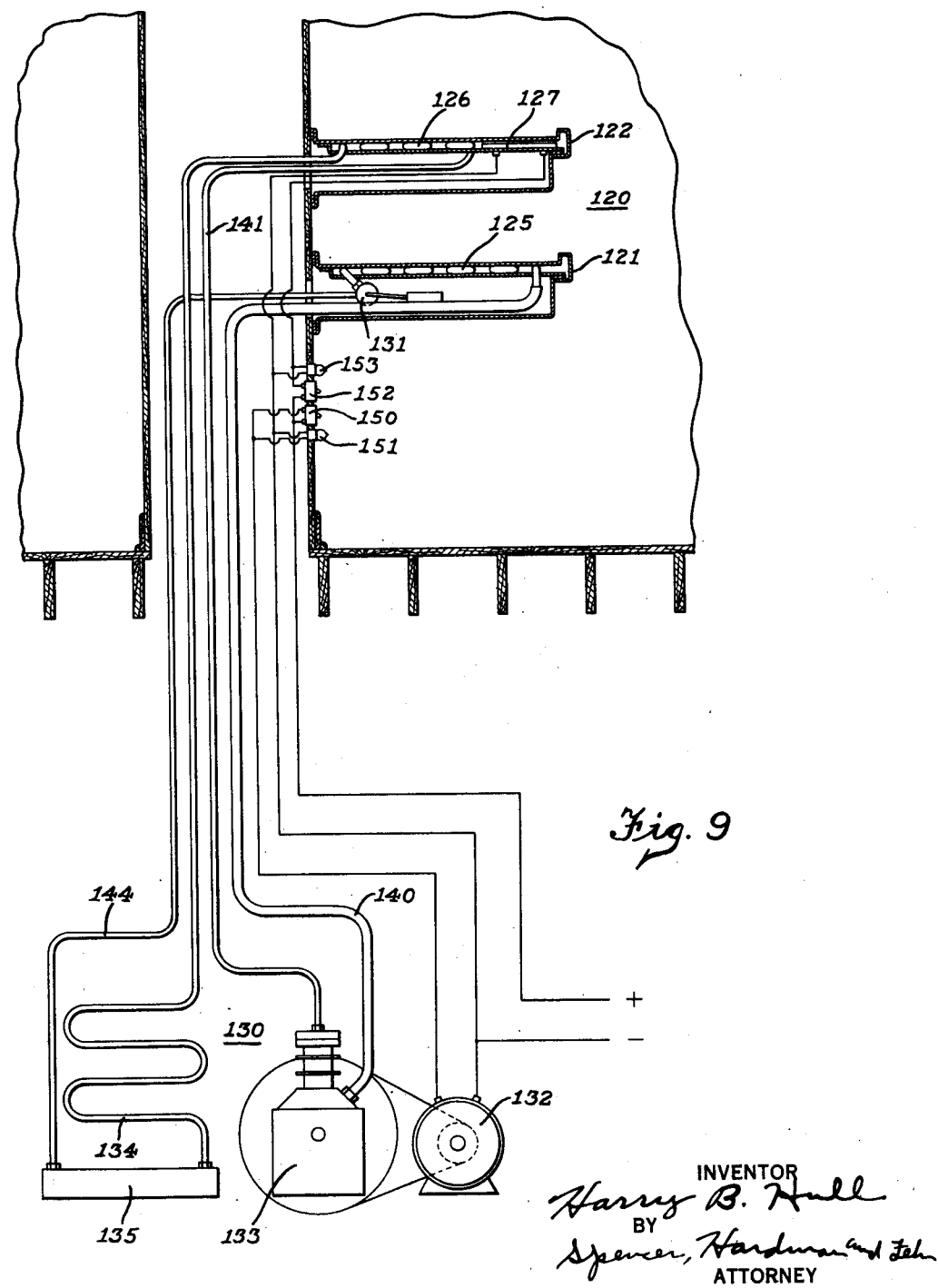

Patented Oct. 11, 1932

1,881,603

UNITED STATES PATENT OFFICE

HARRY B. HULL, OF DAYTON, OHIO, ASSIGNOR TO FRIGIDAIRE CORPORATION, OF DAYTON, OHIO, A CORPORATION OF DELAWARE

REFRIGERATING APPARATUS

Application filed December 30, 1930. Serial No. 505,578.

This invention relates to refrigerating apparatus and more particularly to apparatus for the cooling and the heating of food articles and is particularly adapted for use in hospitals, restaurants, hotels and the like.

An object of this invention is to provide an improved means for the cooling of and heating of food articles.

Another object of this invention is to provide an improved serving device for food articles and to employ an enclosed refrigerating system for maintaining said food articles at the desired temperatures. One manner of practicing this invention is to employ one of the inherent characteristics of an enclosed refrigerating system for applying heat to some of said food articles and to employ one of the well known characteristics of such a refrigerating system for the cooling of other of said food articles.

Further objects and advantages of the present invention will be apparent from the following description, reference being had to the accompanying drawings, wherein a preferred form of the present invention is clearly shown.

In the drawings:

Fig. 1 is a side view in elevation of a refrigerating apparatus embodying features of my invention;

Fig. 2 is an end view of the apparatus shown in Fig. 1;

Fig. 3 is an enlarged view in cross section of the apparatus shown in Figs. 1 and 2, the view being taken along the line 3—3 of Fig. 2;

Fig. 4 is a diagrammatic illustration of the refrigerating and heating system employed in the apparatus shown in Figs. 1, 2 and 3;

Fig. 5 is an end view of the apparatus shown in Fig. 1, partly in elevation and partly broken away, embodying features of the invention;

Fig. 6 is a vertical cross sectional view of the apparatus shown in Fig. 5, and showing the heating apparatus in elevation;

Fig. 7 is a vertical cross sectional view of a portion of the apparatus shown in Fig. 5 and showing the cooling element in elevation;

Fig. 8 is a diagrammatic illustration of the modified form of serving table embodying features of my invention; and Fig. 9 is a diagrammatic illustration of a serving rack embodying features of the present invention.

Referring to the drawings and particularly to Figs. 1, 2 and 3, the numeral 20 designates in general a refrigerating apparatus embodying features of the invention. The apparatus 20 comprises in general a cabinet 22 which includes an angle iron frame 24 and an outer metal casing 25. The cabinet 22 also includes means for the storage of food articles to be cooled and means for the storage of food articles to be heated. The means for the storage of food articles to be cooled comprises a flat shelf or tray like member 26 and the means for the storage of food articles to be heated comprises a flat shelf or tray like member 28 which is mounted above the shelf 26. The outer casing 25 is provided with openings 25a in the side and end walls thereof to enable the user of the apparatus to place food articles upon the shelf 26 to be cooled. The cabinet 22 is also provided with suitable casters which permits the cabinet to be readily moved to any desired place. The cooling shelf 26 and the heating shelf 28 are adapted to be cooled and heated by a closed refrigerating system designated in general by the numeral 35 in a manner hereinafter described.

The refrigerating system 35 comprises a cooling element or evaporator 37 and a condensing element 38. The condensing element 38 withdraws the gaseous refrigerant from the evaporator 37 through a vapor conduit 39 connected to the evaporator 37, compresses the gaseous refrigerant and delivers it to a condenser 42 wherein it is liquefied and from which it is delivered to a receiver 44. The liquid refrigerant is delivered from the receiver to the cooling element 37 through a supply conduit 45 under the control of an expansion valve 47. The condensing element includes the condenser, compressor 50 and a motor 52. The motor 52 is adapted to drive the compressor 50 and is controlled, preferably, by manually operated switch 54. The refrigerating system 35 also includes a heating element 55, and auxiliary heating means such as an electric heating coil 57, which heating coil is controlled by switch 58. If desired a lamp or other signaling device 60a may be connected in parallel with the circuit of the heating coil 57 to thus inform the user of the apparatus as to whether or not current is being supplied to the coil 57.

The heating element 55 comprises a coiled conduit in the form of a serpentine coil and utilizes one of the inherent characteristics of a closed refrigerating system for applying heat to the shelf 28. This inherent characteristic of the system comprises utilizing the heat of compression for applying heat to said shelf. In order to increase the quantity of heat which is accomplished due to compressing action which takes place in the compressor 50 a quantity of inert gas, such as air, non-condensable at temperatures prevailing in the system is injected into said system. It has been found that by injecting a predetermined quantity of inert gas into the refrigerating system that a fifty per cent increase in temperature may be accomplished in the element 55. In the event it is desired to apply heat to some of the food articles stored on the shelf 28 at temperatures greater than the temperature provided by the heating element 55 the heating coil 57 has been provided for furnishing the additional heat required.

The operation of the refrigerating system takes place upon closing of switch 54 which causes the motor 52 to drive the compressor which withdraws the gaseous refrigerant from the evaporator 37 through conduit 39, compresses the gaseous refrigerant and delivers it in a heated condition to the coil 55 whence it is delivered to the condenser 42 and later delivered to the cooling element 37 in the manner previously described. As shown in Fig. 3 the cooling element 37 is secured to the under side of the cooling shelf 26. This cooling element may be secured to the shelf 26 in any suitable manner, preferably by solder. The heating element 55 is secured to the under side of the heating shelf 28, preferably by solder. A suitable drainage receiver 60 is located in the cabinet 22 directly below the cooling element 37 for receiving any drippings from the element 37 and for conducting the drippings to a drain pipe 62 which leads to a removable drain receptacle 64. The cabinet 22 is provided with an insulating separating wall 65 which separates the upper part of the cabinet which includes the heating and cooling shelf from a lower or machinery compartment 67 which houses the motor, compressor and condenser units of the condensing element 38. The insulating separating wall 65 prevents the heat developed in the machinery compartment from being transferred to the cooling element 37.

Referring to the modifications shown in Fig. 8, there is shown a serving table designated in general by the numeral 80. The table 80 is provided with a plurality of cooling plates 81 adapted to receive food articles to be cooled, and also includes a plurality of hot plates 82 adapted to receive food articles to be heated. The plates 81 and 82 are adapted to be cooled and heated respectively by means of a closed refrigerating system designated in general by the numeral 85. This system may be installed in the cabinet 80 but for the purpose of clear illustration is shown diagrammatically with a portion removed from said cabinet. The system includes a cooling element or evaporator 90 for cooling the cold plates 81, and the heating element 91 for heating the hot plates 82. The evaporator 90 is adapted to be supplied refrigeration by a condensing element 95 under the control of an expansion valve 96. The condensing element 95 withdraws the gaseous refrigerant from the evaporator 90 through a vapor conduit 97, compresses the gaseous refrigerant and delivers it to the evaporator 90 through the supply conduit 98. The system 85 also includes the heating element 91 which is heated by means of utilizing the heat of compression in a like manner as described in connection with the heating element 55 employed for heating shelf 28 of cabinet 22. The operation of the refrigerating system 85 takes place upon closing switch 100 which causes motor 101 to drive compressor 102 which compresses the gaseous refrigerant and delivers it in a heated condition to the heating element 91 whence the gaseous refrigerant passes to a condenser 105 wherein it is liquefied and from which it is delivered to a receiver 106 which has a connection with a supply conduit 98. If desired, a quantity of inert gas, such as air, may be injected into the refrigerating system 85 to thus increase the heat of compressed gas in said system.

As disclosed in Fig. 9 an improved serving device embodying features of my invention includes a serving rack designated in general by the numeral 120. The rack 120 as disclosed in the drawings comprises a shelf 121 and a second shelf 122 which is located above the shelf 121. It is to be understood, however, that said shelves may be located on the same horizontal plane if desired. The rack 120 is adapted to be placed adjacent the wall of the building in which the server is installed, and in an installation of this type the refrigerant pipes or the like may be located between the partition walls of the building and lead to the condensing element which may be, in this instance, installed in the basement of the building. The shelf 121 is provided with a cooling element 125 which corresponds to the cooling element 37 and the shelf 122 is provided with a heating element 126 which corresponds to the heating element 55. The shelf 122 is also provided with auxiliary means 127 which corresponds with electric heating coil 57. Refrigerant is supplied to the cooling element 125 by a condensing element 130 under the control of an expansion valve 131. The condensing element 130 includes a motor 132, compressor 133, condenser 134 and compressor 135. The condensing element withdraws the gaseous refrigerant from the evaporator through the vapor conduit 140, compresses the gaseous refrigerant and delivers it to a heating element 126 through conduit 141 whence the gaseous refrigerant is delivered to the condenser 134 wherein it is liquefied and from which it is delivered to the receiver 135. The liquid refrigerant is supplied to the evaporator 125 through a supply conduit 144 which interconnects the receiver and the expansion valve 131. Thus it will be noted that food articles placed on the shelf 121 will be cooled by refrigeration supplied by the cooling element 125 and that food articles placed on the shelf 122 will be heated by heat supplied to the heating element 126 by utilizing the heat of compression which takes place in a system of this type. If desired, an inert gas, such as air, may be injected into the refrigerating system for increasing the heat of compression to thus raise the temperature in the heating element 126. The operation of the condensing element 130 is controlled by switch 150, while a warning of signaling lamp 151 is provided for notifying the user of the device as to whether or not the condensing element is in operation. Likewise, a switch 152 is provided for controlling the flow of electric current to the heating coil 157 and a signal device 153 is provided so that the user of the device can tell if current is being supplied to the heating coil 157.

It is to be understood that a closed refrigerating system of the so-called compression refrigerating system of the type herein described will increase the temperature of the gaseous refrigerant upon compression thereof, but it is also to be understood that a refrigerating system of the so-called absorption type wherein the refrigerant is compressed upon leaving the generator thereof is also applicable to the present invention and is capable of producing heat for applying heat to a heating element for heating food articles on a serving table or the like in a like manner as the system herein described and disclosed, and that such absorption system is within the scope of the present invention.

From the foregoing description it will be noted that I have provided a refrigerating apparatus in which I employ one of the inherent characteristics of a refrigerating system for applying heat to food articles stored within said apparatus and that I have arranged such system in such a manner so that another characteristic of said system may be employed for cooling other food articles stored in said apparatus.

While the form of embodiment of the present invention as herein disclosed, constitutes a preferred form, it is to be understood that other forms might be adopted, all coming within the scope of the claims which follow.

What is claimed is as follows:

1. A unitary portable refrigerating apparatus comprising in combination a cabinet, means for the storage of food articles to be heated, means for the storage of food articles to be refrigerated, a closed refrigerating system within said cabinet and being so arranged so as to utilize the heat of compression within said system for applying heat to said first named means and also being arranged for supplying refrigeration to said second named means, and auxiliary means for applying heat to said first named means.

2. A refrigerating apparatus comprising in combination a serving cabinet, a heating element in said cabinet adapted for applying heat to food articles, a cooling element within said cabinet adapted for cooling food articles, and a closed refrigerating system arranged for utilizing the heat of compression therein for supplying heat to said heating element and being arranged for supplying refrigeration to said cooling element.

3. A refrigerating apparatus comprising in combination a serving rack adapted to be placed adjacent a wall of the room where installed, a heating element adapted for applying heat to food articles placed on said rack, a cooling element adapted for cooling food articles placed on said rack, and a closed refrigerating system arranged for utilizing the heat of compression therein for supplying heat to said heating element and being arranged for supplying refrigeration to said cooling element.

4. A refrigerating apparatus comprising in combination a serving rack adapted to be placed adjacent a wall of the room where installed, a heating element adapted for applying heat to food articles placed on said rack, a cooling element adapted for cooling food articles placed on said rack, and a closed refrigeration system arranged for utilizing the heat of compression therein for supplying heat to said heating element and being arranged for supplying refrigeration to said cooling element, and auxiliary means for applying heat to the food articles adapted to be heated.

In testimony whereof I hereto affix my signature.

HARRY B. HULL.